United States Patent
Angermann et al.

(10) Patent No.: US 11,104,192 B2
(45) Date of Patent: Aug. 31, 2021

(54) TRAILER COUPLING HAVING A SUPPORT ELEMENT

(71) Applicant: WESTFALIA-AUTOMOTIVE GMBH, Rheda-Wiedenbrück (DE)

(72) Inventors: Kay Angermann, Döbeln (DE); Hendrik Graute, Rietberg (DE); Raphael Gringel, Bielefeld (DE); Arne Kuhlen, Ennigerloh (DE)

(73) Assignee: WESTFALIA-AUTOMOTIVE GMBH

( * ) Notice: Subject to any disclaimer, the term of this patent is extended or adjusted under 35 U.S.C. 154(b) by 281 days.

(21) Appl. No.: 16/334,047

(22) PCT Filed: Sep. 27, 2017

(86) PCT No.: PCT/EP2017/074457
§ 371 (c)(1),
(2) Date: Mar. 18, 2019

(87) PCT Pub. No.: WO2018/060228
PCT Pub. Date: Apr. 5, 2018

(65) Prior Publication Data
US 2019/0270354 A1 Sep. 5, 2019

(30) Foreign Application Priority Data

Sep. 30, 2016 (DE) .................... 10 2016 118 678.3
Dec. 15, 2016 (DE) .................... 10 2016 124 563.1

(51) Int. Cl.
*B60D 1/48* (2006.01)
*B60D 1/06* (2006.01)
(Continued)

(52) U.S. Cl.
CPC .............. *B60D 1/485* (2013.01); *B60D 1/065* (2013.01); *B60D 1/167* (2013.01); *B60D 1/488* (2013.01); *B60D 2001/544* (2013.01)

(58) Field of Classification Search
CPC .......................... B60D 1/485; B60D 2001/544
See application file for complete search history.

(56) References Cited

U.S. PATENT DOCUMENTS

| 6,604,884 B1 | 8/2003 | Ohkura |
| 2012/0292930 A1 | 11/2012 | Hermanson |

(Continued)

FOREIGN PATENT DOCUMENTS

| DE | 1787848 U | 4/1959 |
| DE | 7808690 U1 | 2/1998 |

(Continued)

OTHER PUBLICATIONS

Translation of International Search Report; International Application No. PCT/2017/074457 dated Jan. 24, 2018. ISA/EP.

(Continued)

*Primary Examiner* — Kevin Hurley
(74) *Attorney, Agent, or Firm* — McDonald Hopkins LLC

(57) ABSTRACT

A trailer coupling for a motor vehicle is disclosed, which comprises a carrier assembly having a transverse carrier designed as a profiled part and a retainer retained on the transverse carrier for retaining a coupling element, of the trailer coupling, wherein the coupling element is provided for fastening a trailer or a load carrier, wherein the retainer is connected to the transverse carrier by a tension anchor of a tension anchor assembly wherein the tension anchor penetrates the transverse carrier along the tension anchor load axis of the tension anchor and loads an abutment surface of the retainer, through which abutment surface the tension anchor load axis or an axis parallel to the tension (Continued)

anchor load axis passes, against a side wall of the transverse carrier, said side wall having a through-opening for the tension anchor wherein the tension anchor assembly has a support element having a support surface and a support protrusion, which protrudes from the support surface in the direction of the tension anchor load axis and which engages in the through-opening of the side wall, wherein the support surface of the support element is supported on the side wall of the transverse carrier next to the through-opening by at least one force component in the direction of the load axis and the support protrusion is supported in the through-opening by at least one force component transverse to the load axis.

26 Claims, 5 Drawing Sheets

(51) Int. Cl.
  *B60D 1/167*  (2006.01)
  *B60D 1/54*  (2006.01)

(56) References Cited

U.S. PATENT DOCUMENTS

| | | | |
|---|---|---|---|
| 2016/0311281 A1* | 10/2016 | Mantovani | B60D 1/065 |
| 2018/0222263 A1* | 8/2018 | Kadnikov | B60D 1/246 |
| 2019/0225039 A1* | 7/2019 | Angermann | B60D 1/54 |
| 2020/0180373 A1* | 6/2020 | Lee | B60D 1/485 |
| 2020/0324596 A1* | 10/2020 | Belinky | B60D 1/155 |

FOREIGN PATENT DOCUMENTS

| | | |
|---|---|---|
| DE | 10041063 | 5/2001 |
| DE | 102012022614 | 5/2014 |
| DE | 102013018771 | 5/2015 |
| DE | 102013018771 A1 | 5/2015 |
| FR | 2909948 | 6/2008 |

OTHER PUBLICATIONS

International Searching Authority, European Patent Office, Written Opinion for PCT/EP2017/074457, dated Jan. 24, 2018.
International Bureau of WIPO, International Preliminary Report on Patentability for PCT/EP2017/074457, dated Apr. 2, 2019.

* cited by examiner

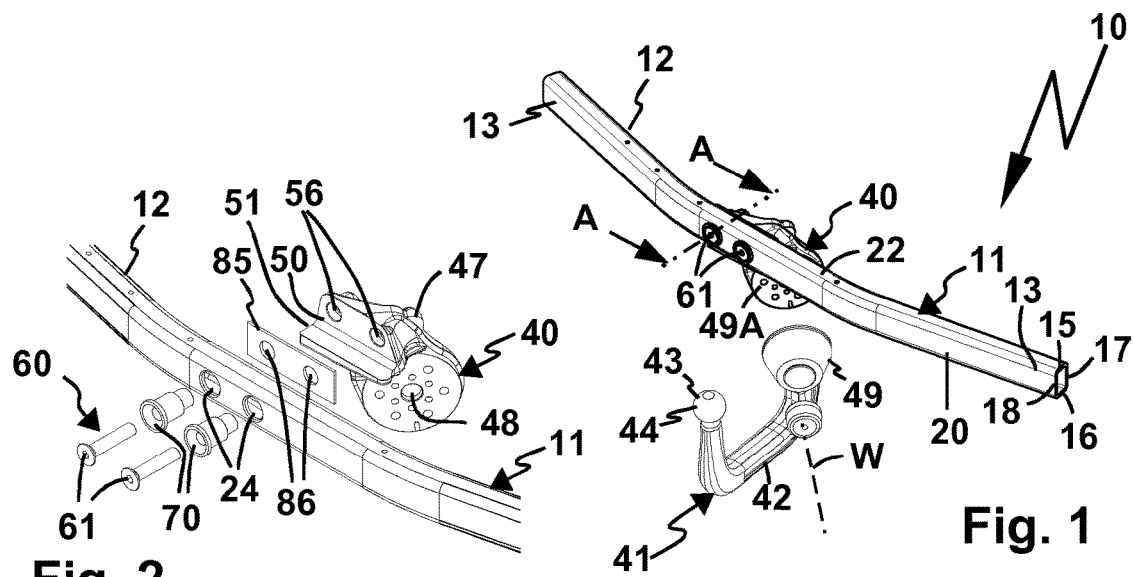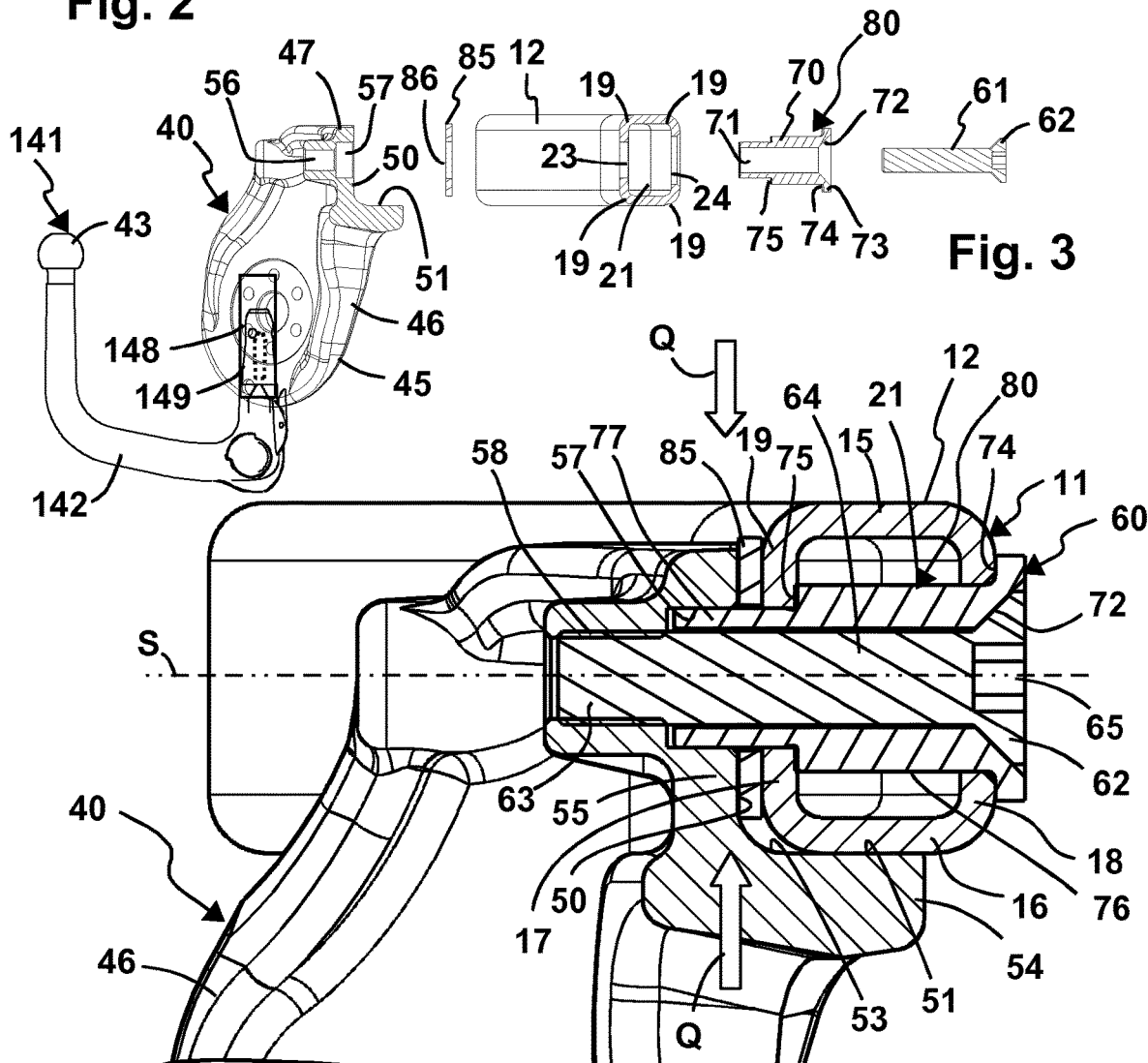
Fig. 1
Fig. 2
Fig. 3
Fig. 4

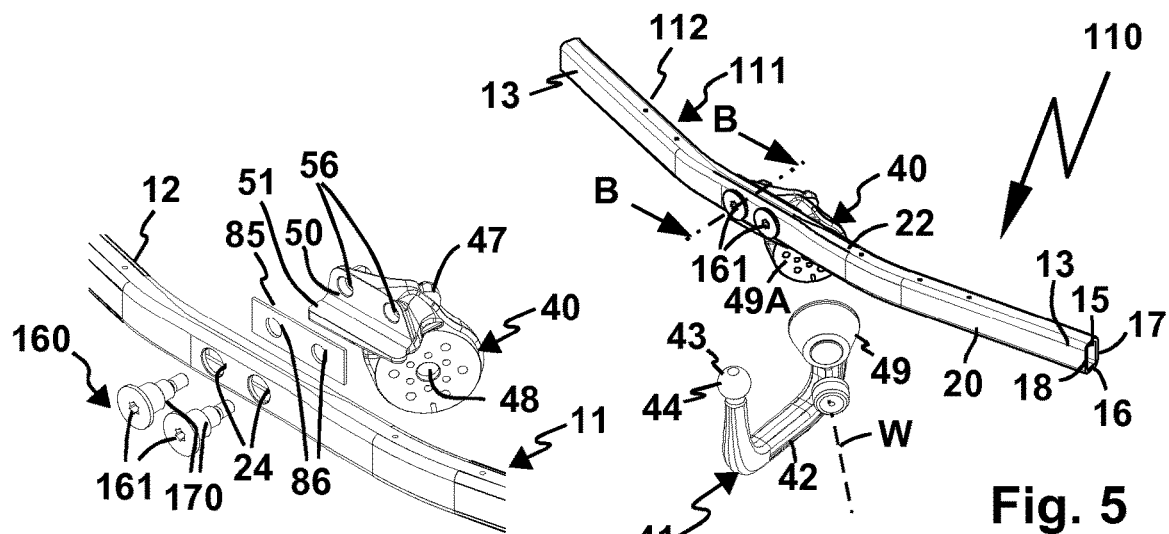
Fig. 5
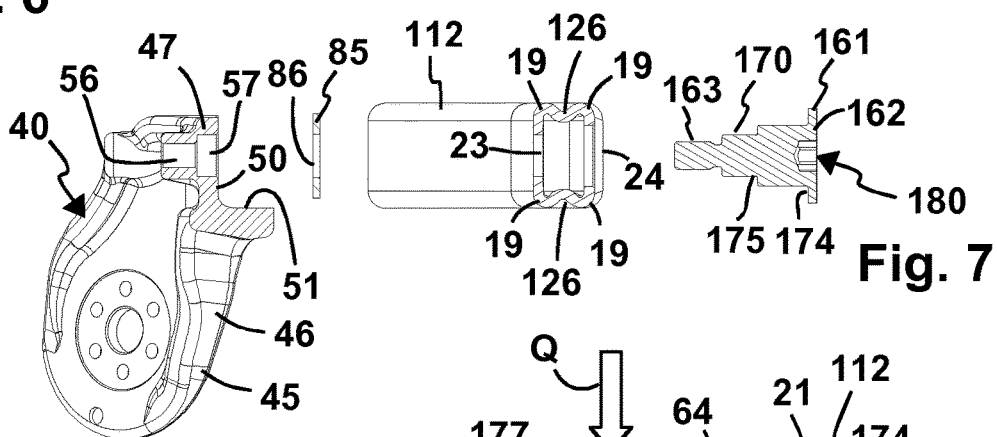
Fig. 6
Fig. 7
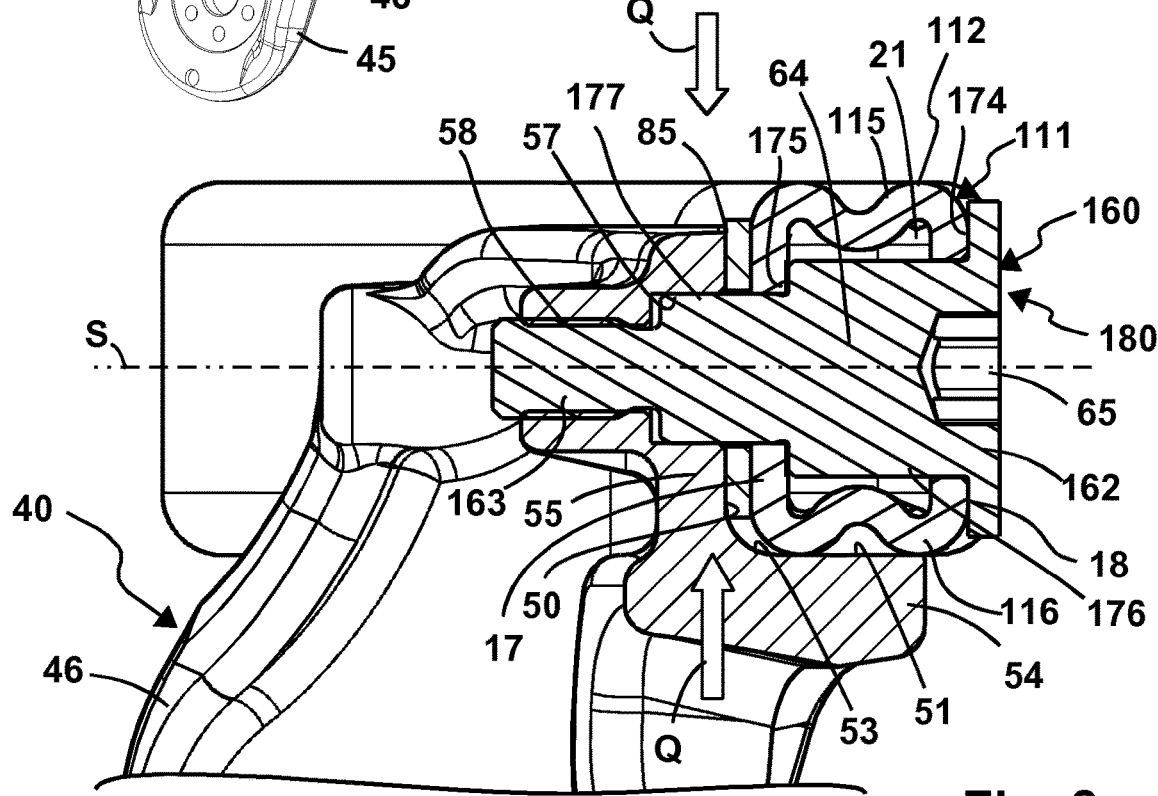
Fig. 8

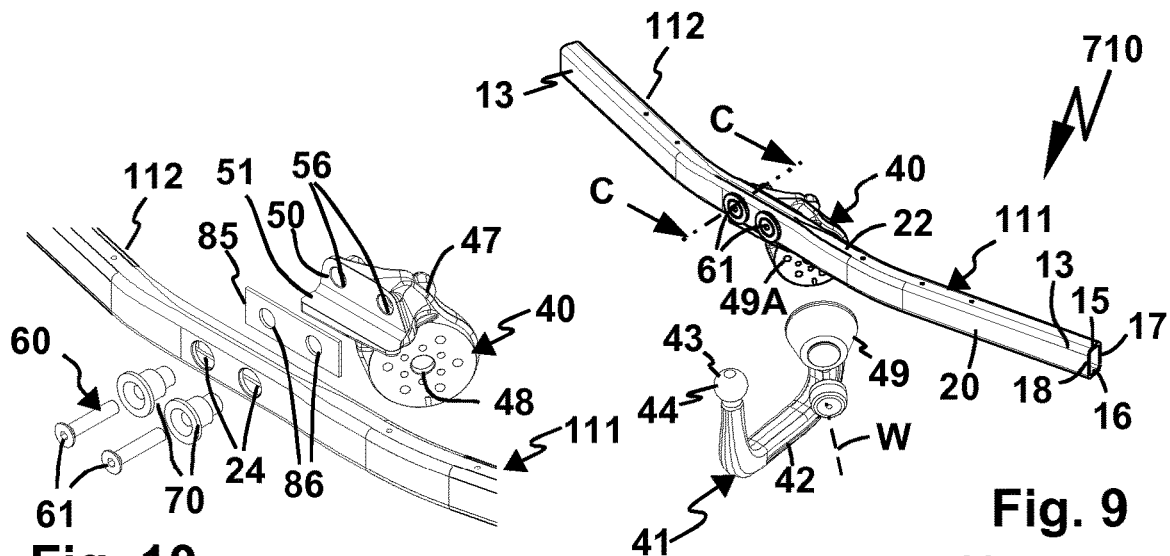
Fig. 9
Fig. 10
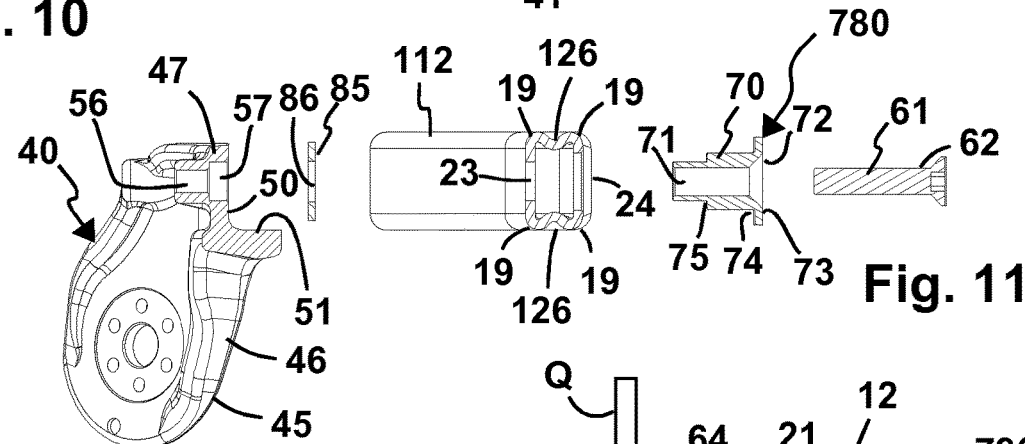
Fig. 11
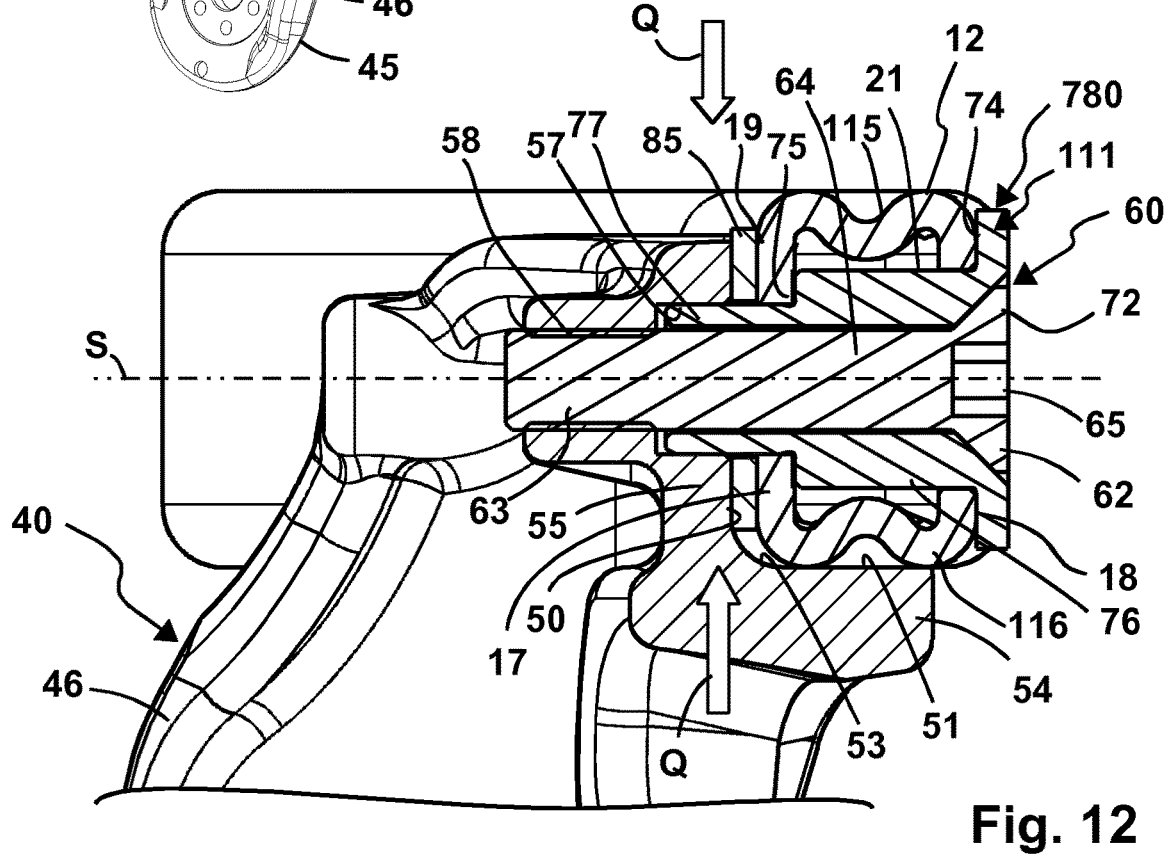
Fig. 12

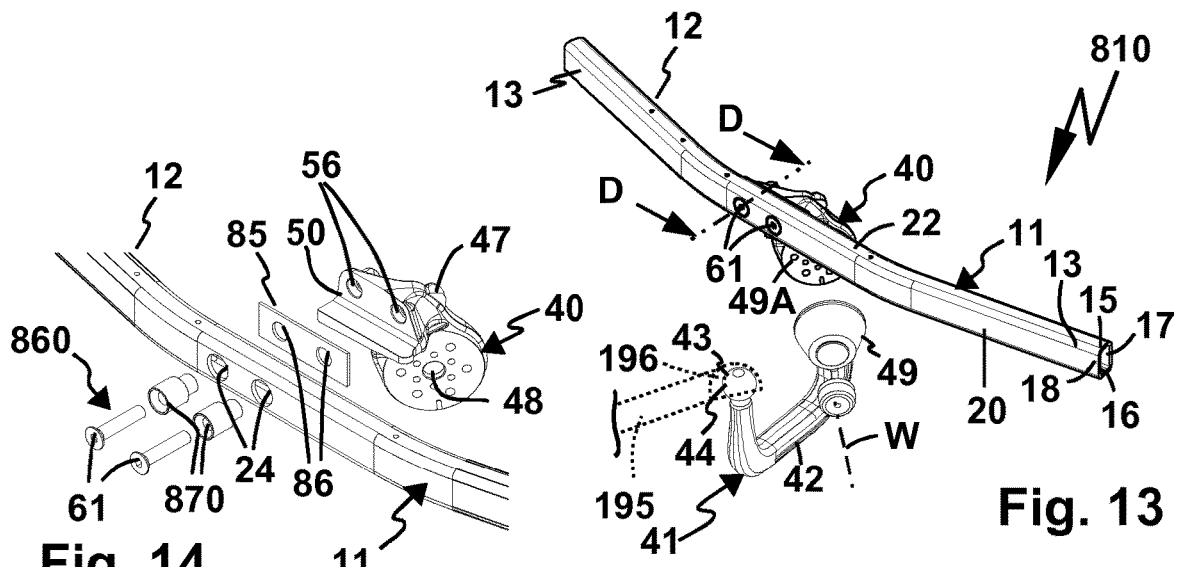
Fig. 13
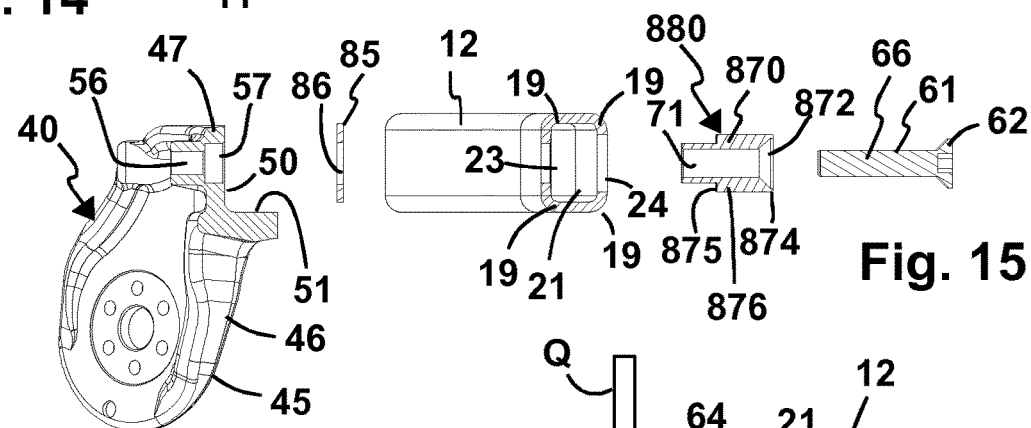
Fig. 14
Fig. 15
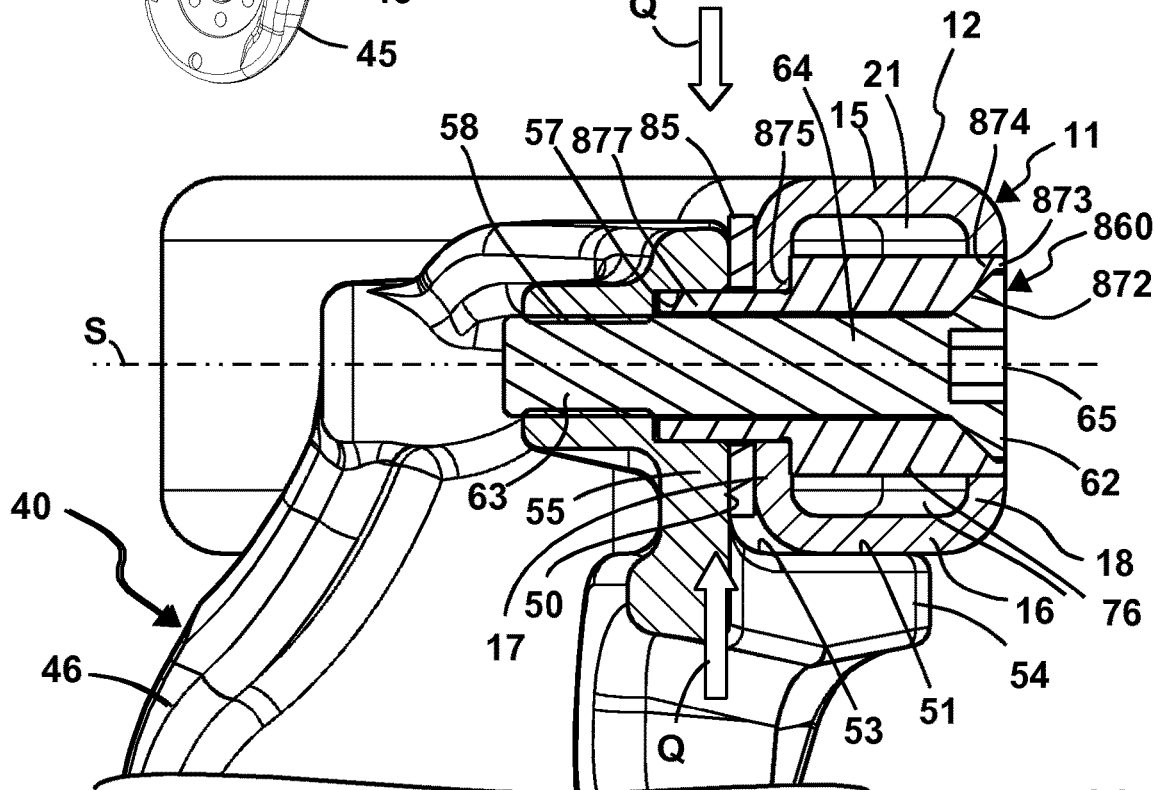
Fig. 16

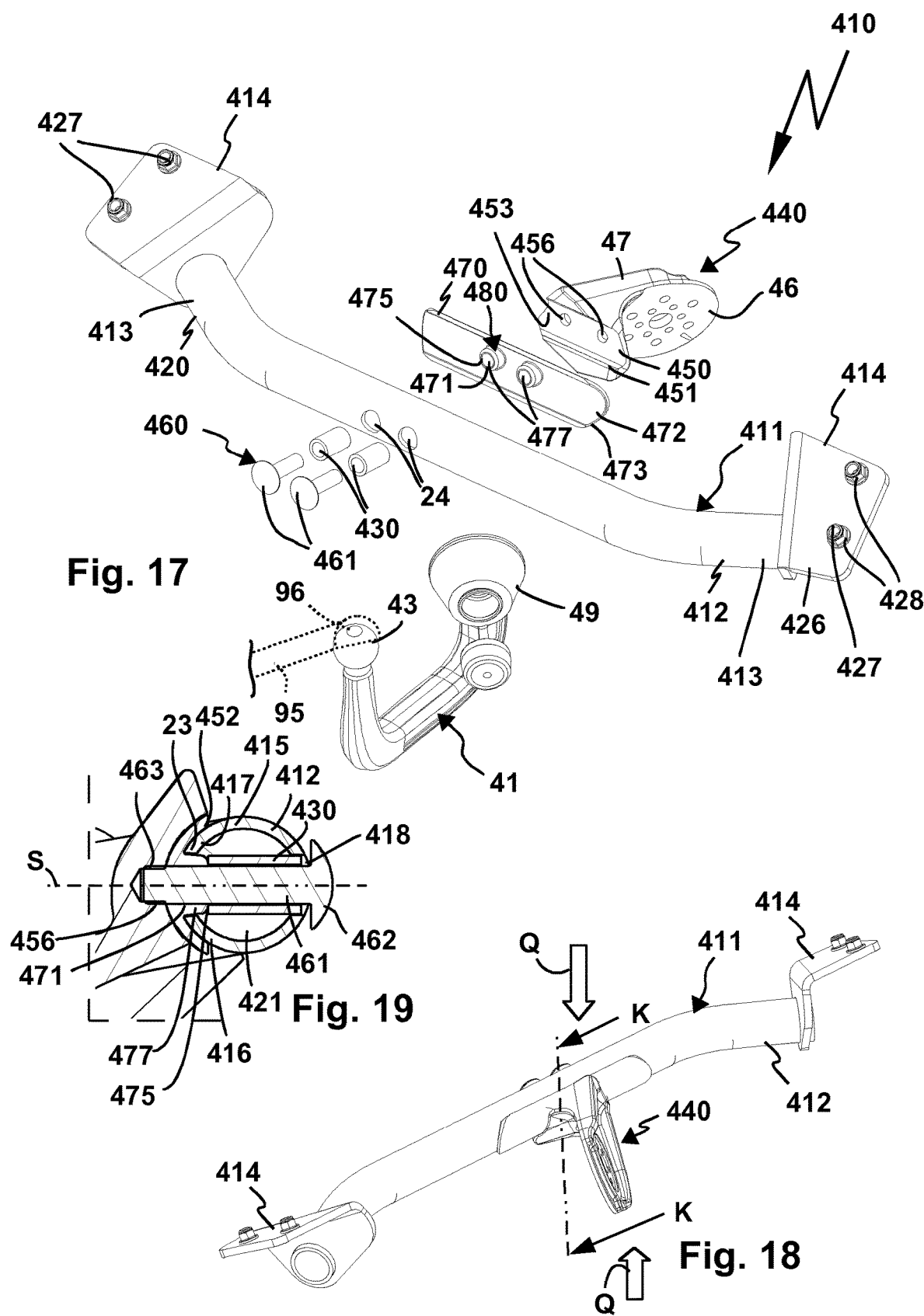

TRAILER COUPLING HAVING A SUPPORT ELEMENT

CROSS-REFERENCE TO RELATED APPLICATION

This application is a 35 U.S.C. § 371 national stage application of PCT Application No. PCT/EP2017/074457 filed on Sep. 27, 2017, entitled "TRAILER COUPLING HAVING A SUPPORT ELEMENT," which claims priority to German Patent Application No. 102016118678.3 filed on Sep. 30, 2016, and German Patent Application No. 102016124563.1 filed Dec. 15, 2016, each of which are incorporated herein in their entirety by reference.

The invention relates to a trailer coupling for a motor vehicle, comprising a carrier assembly, which is provided for arranging on the rear of a motor vehicle and which has a transverse carrier designed as a profiled part at least in some sections and a retainer retained on the transverse carrier for retaining a coupling element, in particular a coupling arm, of the trailer coupling, wherein the coupling element is provided for fastening a trailer or a load carrier, wherein the retainer is connected to the transverse carrier by means of a tension anchor of a tension anchor assembly, in particular a screw, wherein the tension anchor penetrates the transverse carrier along the tension anchor load axis of the tension anchor and loads an abutment surface of the retainer, through which abutment surface the tension anchor load axis or an axis parallel to the tension anchor load axis passes, against a side wall of the transverse carrier, said side wall having a through-opening for the tension anchor.

Such a trailer coupling is, for example, described in DE 10 2013 018 771 A1. The problem with this trailer coupling is that, by way of example, the threaded bolt of the tension anchor assembly is freestanding in the through-opening of the side wall of the transverse carrier, meaning that shearing forces can occur, acting transversally to the load axis on the threaded bolt, and can thus also damage this. To avoid this problem, on the known trailer coupling the through-opening has a broad cross section so that there is little or no loading of the threaded bolt transversally to its load axis.

Therefore, the object of the present invention is to provide a trailer coupling with improved loadability.

This object is achieved with a trailer coupling of the abovementioned type in that the tension anchor assembly has a support element having a support surface and having a support protrusion, which protrudes from the support surface in the direction of the tension anchor load axis and which engages in the through-opening of the side wall, wherein the support surface of the support element is supported on the side wall of the transverse carrier next to the through-opening by means of at least one force component in the direction of the load axis and the support protrusion is supported in the through-opening by means of at least one force component transverse to the load axis.

By way of example, the force component can comprise or be a force component at a right angle or oblique angle to the load axis. By way of example, the force component can be understood to be a supporting force component.

By way of example, the transverse carrier is designed as a fully or partially hollow profile.

A preferred concept provides that the support surface of the support element is opposite the abutment surface of the retainer, so that the side wall of the transverse carrier is sandwiched between the support surface and the abutment surface. Here, an embodiment is also possible in which between the side wall of the transverse carrier and the abutment surface a further layer, in particular a further support element is present. By way of example, this further support element can be designed as a plate or comprise a plate.

Expediently, the support element is a component that is separate from a tension anchor, by way of example a threaded bolt, a rivet or similar. It is also advantageous if the support element is a component that is separate from the retainer. Thus, the support element can be used as required. Manufacture is simple. The support element can form part of an assembly kit.

The support element can, for example, be arranged in an interior space of the profile part. But the support element can also, in particular when configured as a component that is separate from the retainer, rest externally against the transverse carrier. Consequently, in this embodiment the support element is arranged outside of the profile part, apart from the at least one support protrusion, which engages in the through-opening of the profile part.

By way of example, the support protrusion can have a receptacle or through-opening, in which the tension anchor engages or which the tension anchor penetrates. But it is also possible for a fastening section to protrude from the support protrusion, which, by way of example, is opposite a side wall opposite the side wall described thus far. A screwing device, in particular a nut, can for example by screwed onto this fastening section from the outside.

The support element is preferably plate-like. By way of example, the support element can thus comprise a support plate.

It is also advantageous if the support element has the same contour as the side wall of the transverse carrier. Thus, by way of example, where the side wall of the transverse carrier is rounded, the support element can be provided with a rounded contour. By way of example, the support element can essentially be formed by a recessed plate. By way of example, however, it is also possible for the front side of the sleeve or support sleeve further described below to have a contour that matches the inner contour or outer contour of the transverse carrier.

A preferred concept provides that the support element is supported in a planar fashion by the transverse carrier. By way of example, the support element is supported with a base area on the transverse carrier, in particular when designed as a support plate.

The support element may have just a single support protrusion, by way of example be designed as a support sleeve. However, preference is also for the embodiment in which the support element has two or more support protrusions. In particular, the support element can be designed like a support plate, on which a plurality, by way of example at least two, support protrusions are present for engaging in corresponding through-openings or receptacles on the transverse carrier as shown in FIG. 2 as 70S.

Expediently, the support element has a head, which is accommodated in a second through-opening of a second side wall, opposite the side wall of the transverse carrier, which accommodates the support protrusion and thus forms a first side wall.

At this point it is worth mentioning that the profile part can have a closed profile or a laterally open profile, at least in sections. Thus, by way of example, the profile part can have a U-shaped cross section. But the profile part can also be a closed profile, for example a profile with a square, round or oval cross section. By way of example, a profile part or profile with a U-shaped cross section when designed as a side limb has opposing first and second side walls.

The profile part of the transverse carrier can extend uniformly over the full length of the transverse carrier, i.e. by way of example the transverse carrier has a round or closed cross section over its full length. But it is also possible for the transverse carrier to have different cross sections or profile contours over its length. Thus, by way of example, the transverse carrier can have a closed profile at a mid-section, by way of example a round profile, whereas at its longitudinal ends it is L-shaped or U-shaped in cross section. By way of example, the transverse carrier can be manufactured by forming, extrusion or similar from a single blank, and thus can, so to speak, be in a single piece. But it is also possible for the transverse carrier to comprise sections, by way of example profiles of a different type and/or geometry, that have been welded, glued or otherwise joined together.

The head can be freestanding in the through-opening of the second side wall. It is preferable if the head is supported transversally to the load axis on at least one inner contour of the second through-opening. By way of example, the head can have a round outer contour and the second through-opening a round inner contour, so that the head is accommodated with a positive fit in the through-opening. The round outer contours and inner contours allow rotatability of the head, so that the head, by way of example when the support element is designed as a screw, is rotatable. But it is also possible for the outer contour of the head and the inner contour of the second through-opening to form or have an anti-rotation lock, by way of example a polygonal cross section. Thus, the head can be accommodated in the second through-opening secured against rotation.

The head can, for example, be the head of a screw, but also the head of a support element designed as a support sleeve and further described below.

The head can protrude laterally from the second through-opening or the through-opening of the second side wall. By way of example, it is possible here for the head to load the second side wall in the direction of the first side wall or the retainer. So, consequently, the head can, so to speak, load the second side wall in the direction of the retainer.

With this measure it can be provided that the cross section of the profile part or transverse carrier is unaffected or undamaged. But a certain deformation is also possible, i.e. the head deforms the transverse carrier somewhat in the direction of the retainer, allowing a particularly firm retention.

By way of example, a preferred embodiment of the invention provides that a side wall joining the first and the second side wall, by way of example opposing side walls, is deformed by the tension anchor, by way of example its head, by a nut, which is screwed onto the tension anchor or similar, transversally to the load axis. By way of example, a recess or indentation can be formed by this deformation on the side wall. The side wall is, for example, a top or bottom side wall of the transverse carrier (in the use position or in the state when mounted on the motor vehicle).

The support surface is in particular provided on a threaded bolt, which protrudes with a screw portion towards the retainer, by way of example is screwed into a threaded receptacle of the retainer or penetrates a through-opening of the retainer and with its section protruding from the through-opening is secured by a nut. The support surface protrudes like a step laterally from the screw portion. Consequently a kind of stepped bolt is formed.

The support protrusion can, for example, be formed by the screw portion or a bolt portion provided between the screw portion and the support surface. Expediently, no screw thread is provided on the bolt portion.

The support surface can also be provided on a support sleeve, which has a through-opening for the tension anchor and which is penetrated by the tension anchor. Expediently, the support sleeve is arranged in the interior space or an interior space of the profile part. By way of example, the tension anchor is formed by a threaded bolt, which is pushed through the support sleeve and in particular screwed to the retainer. However, a groove can also be provided on the retainer for loading the tension anchor.

The support sleeve has a head portion, which protrudes laterally from the second through-opening. Expediently, a head of the tension anchor, for example a screw head, a groove or similar, is accommodated in the head portion. The head receptacle can similarly protrude laterally from the second through-opening. By way of example, the head portion can serve to load the second side wall in the direction of the first side wall. If the head of the tension anchor is similarly
accommodated in the head portion, this preferably similarly protrudes laterally from the through-opening. Thus, the head of the tension anchor can act directly on the second side wall.

It is also possible for the support sleeve not to protrude from an outer side of the second side wall facing away from the first side wall, by way of example if it is in line with or sits back behind the outer side. By way of example, the support sleeve is, so to speak, flush undermounted with regard to the outer side. By way of example, if the head of the tension anchor is screwed in the direction of the retainer or a nut is screwed onto the tension anchor, this can load the second side wall in the direction of the retainer, without the support sleeve, so to speak, being in the way.

It is preferable if at least one tension anchor or all tension anchors of the tension anchor assembly do not protrude from a side wall, also referred to above as a second side wall, of the transverse carrier, opposite the side wall accommodating the support protrusion. Thus, no screw heads are, so to speak, in the way. But it is also possible for the tension anchor or a sleeve, in which the tension anchor is accommodated, in particular the support sleeve, to be supported in the, so to speak, second side wall, transversally to the load axis. This will become clearer from an exemplary embodiment in the drawing.

Expediently, on the retainer a receptacle is provided for the support protrusion, in which the support protrusion engages. Expediently, the support protrusion is supported in the receptacle transversally to the load axis, preferably not only via a partial circumference, but via its entire outer circumference. Thus, the support protrusion is supported on the retainer transversally to the load axis. But the tension anchor is essentially loaded there by forces along its longitudinal axis or load axis only. It is preferable if the support protrusion is supported at one end in the receptacle of the retainer and at the other in the through-opening of the transverse carrier transversally to the load axis, in particular in a plurality of directions transversally to the load axis or all directions transversally to the load axis. The support protrusion then absorbs transverse forces transversally to the load axis, which thus cannot load the tension anchor or only insignificantly.

By way of example, the support protrusion thus forms a longitudinal guide for the tension anchor.

It is advantageously provided that the retainer has at least one side support surface, which protrudes from the abutment surface next to the tension anchor and bears against the transverse carrier, so that the retainer is supported on the transverse carrier laterally next to the tension anchor in respect of a force acting transversally to the tension anchor load axis of the tension anchor.

The force could also be referred to as at least one force, e.g. so that the retainer on the transverse carrier is supported by the at least one side support surface laterally next to the tension anchor in respect of at least one force acting transversally to the tension anchor load axis of the tension anchor.

It is a basic concept here that the transverse carrier and the retainer support each other laterally next to the tension anchor, so that transversally to the tension anchor load axis of the tension anchor, forces acting on the retainer, by way of example support forces on the coupling arm or coupling element or thrust and traction forces on the coupling element, are transferred via the at least one side support surface to the transverse carrier. In this way, the tension anchor is exclusively or at least substantially exclusively force-loaded in the direction of its tension anchor load axis or tensile axis, and thus only has to absorb tensile forces, whereas forces acting transversally to its tension anchor load axis are intercepted by the at least one lateral side support surface of the retainer at least partly.

The force with which the at least one side support surface supports the retainer and the transverse carrier against each other, can comprise one or more forces and/or one or more force components, by way of example a force component running in the Y-direction or vehicle transversal direction and/or a force component running in the Z-direction or parallel to the vehicle vertical axis.

By way of example, the at least one side support surface can support the retainer in respect of the transverse carrier with regard to a torque, running about the tension anchor load axis. However, the supporting of the retainer by means of the side support surface in respect of the transverse carrier can also be a rotational support or a support in respect of a torque, which occurs about a rotational axis at an angle, in particular a right angle, to the tension anchor load axis, between the retainer and the transverse carrier, which in particular intersects the tension anchor load axis in the region of the tension anchor. So, by way of example, if the tension anchor load axis runs in the direction of travel or X-direction, the at least one lateral surface can support a torque in respect of the X direction and/or a torque in respect of a Y direction or direction transversal to the vehicle and/or a torque in respect of a Z-direction or a direction parallel to the vehicle vertical axis.

It is preferable if the abutment surface and the at least one side support surface are at right angles to each other. Thus, the at least one side support surface preferably extends parallel to the tension anchor load axis of the tension anchor.

The at least one side support surface can also comprise a side support surface that is rounded and/or not at right angles to the abutment surface or comprise such as side support surface. By way of example, the at least one side support surface can be at an oblique angle to the abutment surface, something like the side limb of a V-shaped configuration.

Expediently, the force, in respect of which the retainer is supported on the transverse carrier by means of the at least one side support surface, runs at right angles or at an angle of approximately 90°, e.g. by way of example between 80° and 100°, preferably between 85° and 95°, to the tension anchor load axis of the tension anchor. In particular, the support force, which the support surface provides, is preferably approximately vertical in the use position of the trailer coupling.

By way of example, the at least one side support surface is provided on a support leg protruding from a main body of the retainer.

The at least one side support surface can also be designed as an indentation on a main body of the retainer. Expediently, the abutment surface is provided on the floor of the indentation.

An expedient concept provides that the at least one side support surface and the abutment surface merge continuously. It is also advantageous if between the side support surface and the abutment surface no edge is provided for.

By way of example, the abutment surface and the at least one side support surface can configure or have a curvature contour. By way of example, the curvature contour can be circular, elliptical or similar.

The at least one side support surface and the abutment surface can also be segments of an overall support surface that is arched or has an arched cross section.

It is preferably provided that between the abutment surface and the at least one side support surface a, by way of example rounded, receiving contour matched to an edge region of the transverse carrier is provided.

It is also advantageous if the transverse carrier bears against the at least one side support surface and the abutment surface and a receiving contour extending between the side support surface and the abutment surface, in a planar or form-fitting manner.

A concept can provide that the at least one side support surface and the abutment surface form an L-shaped configuration.

It is also possible for the side support surface and the abutment surface to form the only support surfaces, with which the retainer is supported on the transverse carrier.

It is also advantageous if the retainer is supported by means of the abutment surface and a single side support surface on the transverse carrier. Expediently here, this side support surface is supported on an underside of the transverse carrier or a surface of the transverse carrier facing the road surface.

Expediently, the abutment surface has a vertical orientation in the use position.

Advantageously, the at least one side support surface runs horizontally in the use position.

It is also possible for the side support surface not to be opposite any further side support surface of the retainer.

However, it is also possible for the abutment surface to, so to speak, form a floor of a clamp-like receptacle, with which two side support surfaces protrude from the abutment surface, which oppose one another and between which the transverse carrier is accommodated.

It is preferably provided that the at least one side support surface comprises a first side support surface and a second side support surface, which face one another, so that the transverse carrier is accommodated between the first and second side support surface.

Here, a preferred concept provides for a U-shaped configuration, meaning that the abutment surface is provided on the floor and the side support surfaces which face one another are provided on side limbs of the receptacle.

By way of example, the side support surfaces which face one another are arranged in a U-shape or V-shape. Thus, by way of example, a receptacle for the transverse carrier with the side support surfaces has a U-shaped or V-shaped cross section.

It is also advantageous if the at least on side support surface is supported on the top or bottom surface of the transverse carrier in the use position. So, for example, the side support surface is supported on a surface of the transverse carrier, which is facing the or a road surface or facing away from the surface. If two side support surfaces are present, these can of course be supported on a top and bottom surface, or one facing away from the road surface and one facing the road surface, of the transverse carrier.

A preferred concept provides that the at least one side support surface is a side support surface which is arranged on a support protrusion, which engages in a receptacle on the transverse carrier. By way of example, the receptacle can be an indentation or recess. By way of example, the indentation is provided on an edge region of the transverse carrier.

It is preferable if the retainer has at least two support protrusions, between which the transverse carrier is arranged.

It is also possible for the receptacle, in which the support protrusion engages, to be a through-opening or a hole on the transverse carrier. In particular, the through-opening is penetrated by the tension anchor.

Expediently, the support protrusion or the at least one support protrusion is arrange next to the abutment surface or on the abutment surface. By way of example, the support protrusion protrudes from the abutment surface. By way of example, it is possible for the support protrusion to be arranged in a transversally or longitudinally central position, or both, on the abutment surface.

It is also advantageous if the support protrusion has a threaded receptacle for screwing on the tension anchor. So, consequently, the tension anchor can be screwed into the support protrusion. It is also possible for the support protrusion to have a through-opening for the tension anchor. By way of example, the tension anchor can penetrate the through-opening of the support protrusion and be connectable or connected with the retainer. By way of example, the tension anchor can be a bar-shaped body, which sticks out from the retainer and penetrates the support protrusion.

It is preferable if between the retainer and the transverse carrier a support element is arranged, which has through-openings for the tension anchor, in particular a plurality of through-openings. For example, the support element can be plate-shaped. By way of example, on the support element two or more through-openings can be provided for tension anchors, wherein expediently these tension anchor through-openings are arranged next to one another in a row. The direction of the row runs along or parallel to a longitudinal direction of the transverse carrier.

A preferred concept provides, for example, that the support element has through-openings for precisely or at least two tension anchors.

It is also advantageous if at least one support protrusion is present on the support element, which enters a receptacle or through-opening of the transverse carrier. By way of example, the support element can thus provide one or more of the side support surfaces for supporting on the transverse carrier.

For its part, the support element is advantageously supported on the retainer, at least on the abutment surface of the retainer. It is possible for the support element to provide one or more of the side support surfaces, but for the retainer itself to not directly laterally support the transverse carrier next to the abutment surface.

The above measure is in particular perfectly feasible with the following advantageous design:

Expediently, the support element is supported on the abutment surface and the at least one side support surface of the retainer. However, it is also possible for the support element to have an outer contour, matched to an inner contour, for example defined by the abutment surface and the at least one side support surface of the retainer and for the outer contour of the support element to be supported on the inner contour of the retainer. However, the inner contour can also be provided elsewhere, i.e., by way of example, the support element is retained with a positive fit on the retainer, which for its part provides the abutment surface and the at least one side support surface for the transverse carrier.

It is possible for the at least one side support surface to be provided for supporting an outer side of the transverse carrier. It is also possible, in particular also in combination with the abovementioned measure, for the at least one side support surface to be provided for supporting on an inner contour, in particular a through-opening or receptacle, of the transverse carrier. At this point it is mentioned that the combination of the abovementioned side support surfaces is in particular possible because a plurality of side support surfaces can be provided. Thus, for example, one side support surface can enter a through-opening or receptacle, while another side support surface supports the transverse carrier externally.

By way of example, the tension anchor load axis is at right angles to the abutment surface.

The tension anchor, by way of example a tension anchor protrusion, can form a single part with the retainer. By way of example, the tension anchor or a tensioning element of the tension anchor can protrude from the retainer in the direction of the transverse carrier. The retaining element can have a screw-in opening or through-opening for the tension anchor.

Preferably, the tension anchor assembly comprises a plurality of tension anchors, in particular a first tension anchor and a second tension anchor. Expediently, the tension anchors are arranged next to one another along a longitudinal axis of the transverse carrier.

By way of example, the tension anchors extend precisely horizontally or substantially horizontally when the trailer coupling is in the fitted state on the motor vehicle.

The invention can be applied in a multitude of ways. By way of example, the retainer can comprise a receptacle to allow attachment or plugging in of a plug-in protrusion or plug-in segment of the coupling element, so that this is, by way of example, configured to be releasable from the retainer. Expediently, to lock the coupling element, a locking device, for example a bolt and positive locking elements or similar are provided on the retainer.

It is also preferable if the coupling element is supported on the retainer by means of a bearing so that is able to pivot and/or displace, in particular between a use position suitable for fastening the load carrier or trailer and a non-use position that is in particular hidden behind a bumper of the motor vehicle.

However, it is also possible for the coupling element to be firmly attached to, in particular forming a single part with, the retainer, for example screwed, welded or produced as a component with the retainer, in particular as a cast part or forged part.

Exemplary embodiments of the invention are described below by means of the drawing, wherein:

FIG. 1 shows a perspective oblique view of the trailer coupling with a carrier assembly, with a retainer and a coupling arm;

FIG. 2 shows an exploded view of the trailer coupling according to FIG. 1;

FIG. 3 shows the components of the trailer coupling according to FIG. 2, in cross section approximately along a line of intersection A-A in FIG. 1;

FIG. 4 shows a cross section through the trailer coupling according to FIG. 1, approximately along a line of intersection A-A;

FIG. 5 shows a further trailer coupling, shown in

FIG. 6 in an exploded view;

FIG. 7 shows die components of the trailer coupling according to FIG. 6, in cross section approximately along a line of intersection B-B in FIG. 5;

FIG. 8 shows a cross section through the trailer coupling according to FIG. 5, approximately along a line of intersection B-B;

FIG. 9 shows a further trailer coupling, shown in

FIG. 10 in an exploded view;

FIG. 11 shows the components of the trailer coupling according to FIG. 10, in cross section approximately along a line of intersection C-C in FIG. 9;

FIG. 12 shows a cross section through the trailer coupling according to FIG. 9, approximately along a line of intersection C-C;

FIG. 13 shows a further trailer coupling, shown in

FIG. 14 in an exploded view;

FIG. 15 shows the components of the trailer coupling according to FIG. 14, in cross section approximately along a line of intersection D-D in FIG. 13;

FIG. 16 shows a cross section through the trailer coupling according to FIG. 13, approximately along a line of intersection D-D;

FIG. 17 shows an exploded view of a further trailer coupling with a retainer, which has a lateral side support surface and support protrusions on a support element;

FIG. 18 shows the trailer coupling according to FIG. 17 in the assembled state; and FIG. 19 shows a cross section through the trailer coupling according to FIG. 17 approximately along a line of intersection K-K.

A trailer coupling 10 according to FIG. 1 comprises a transverse carrier 11 of a carrier assembly 12. By way of example, the transverse carrier 11 is provided at its longitudinal end regions 13 with side carriers 14 shown schematically in FIG. 9, fastened to bodywork 91 of a motor vehicles 90, by way of example screwed and/or welded and/or glued. The transverse carrier 12 extends in the vehicle transverse direction of the motor vehicle 90 by way of example behind a bumper 92, so that when in use it is not visible. In principle, it would be possible to fasten the transverse carrier 12 directly to the bodywork 91, by way of example by directly screwing, welding or similar the longitudinal ends 13 to the bodywork 90 or fastening them elsewhere.

The transverse carrier 12 has a rectangular cross section and in the assembled state on the motor vehicle 90 of the carrier assembly 11 top and bottom side walls 15, 16, which are connected together by a front and rear side wall 17, 18. Between the side walls 15-18 curved segments 19 are provided, so that the profile of the transverse carrier 12 has rounded edges rather than any sharp edges (which would also be possible, however).

The transverse carrier 12 is configured as a profile part 20. The side walls 15-18 delimit a hollow space 21.

On a central section 22 of the transverse carrier 12, a retainer 40 is arranged, on which a coupling arm 42 is retained as a coupling element 41. On a free end region of the coupling arm 42 or the coupling element 41 there is a coupling piece 43 for coupling a load carrier or, as shown in FIG. 9, a trailer 95. By way of example, the trailer 95 has on its drawbar what is known as a ball-type coupling 96, which can be releasably connected to the coupling piece 43, in this case a coupling ball 44, in an in itself known manner. A load carrier 195 could be fastened to the coupling piece 43 in a similar manner, by way of example by means of a clamp coupling 196.

The coupling element 41 is arranged on a retaining section 45 of the retainer 40. Here, a fixed arrangement would be possible, but, by way of example, so would a plug-in connection with a plug-in protrusion and receptacle. By way of example, a plug-in protrusion 149 for plugging into a receptacle 148 on the retaining section 45 can be provided on a coupling element 141 provided in place of the coupling element 41. The associated locking means are not shown in the drawing. The coupling arm 141 could also form a single piece with the retaining section 45 or be connected with this, by way of example, by a screwed connection or welded connection.

In the exemplary embodiments in the drawing, the coupling element 41 is supported so that it can pivot about a pivot axis W between a use position G and a non-use position N, in which it is not suitable for fastening a trailer or a load carrier. By way of example, in the non-use position N, the coupling arm 42 is hidden behind the bumper 92, while in the use position G it protrudes from the bumper with the coupling piece 43.

The retaining section 45 comprises a retaining arm 46, which sticks out from a main body 47 of the retainer 40. By way of example, on the retaining arm 46 a bearing seat 48 is provided, in which, by way of example, a bearing bolt is retained in a fixed or rotatable manner, which engages in a pivot section 49 of the coupling element 41. Only positive fit receptacles 49A of a locking arrangement for locking the coupling element 41 in relation to the retainer 40 in the use position G and the non-use position N are visible in the drawing.

It can be imagined that when the trailer coupling 10 is in use high forces are generated, i.e. high support forces, tensile forces and shearing forces act on the retaining section 45 of the retainer 40 from a load carrier or trailer, but through the measures described in the following for fastening the retainer 40 to the transverse carrier 12, these can be effectively transmitted from the coupling element 41 to the carrier assembly 11 and thus ultimately to the bodywork 91 of the motor vehicle 90. The forces generated in driving mode are optimally absorbed by the trailer coupling 10 and transmitted to the motor vehicle 90 or its bodywork 91.

The concepts described in the following for fastening retainers to a transverse carrier to some extent refer to the same or similar components in various exemplary embodiments, so that in this regard identical or similar reference numerals have been selected. If components differ from one another, then largely reference numerals have been selected which differ from one another merely by "100".

The retainer 40 is supported on the transverse carrier 12 on an abutment surface 50. A side support surface 51 protrudes from the abutment surface 50. The transverse carrier 12 is supported on the side support surface 51 by its bottom side wall 16, and on the abutment surface 50 by its front side wall 17. Thus, the abutment surface 50 and the side support surface 51 are arranged at the same angle to one another as the outer sides of the side walls 17, 18.

Consequently, the transverse carrier 12 is supported in a receptacle 53 of the retainer 40 with a positive fit and not just in one direction, but in directions at an angle to one another. By way of example, the side support surface 51 is provided on a support leg 54, which protrudes at an angle from a screw leg 55. The support leg 54 and the fastening leg 55 are configured on the main body 47.

The fastening leg 55 serves to fasten the transverse carrier 12 by means of a tension anchor assembly 60. The tension anchor assembly 60 comprises tension anchors 61, which penetrate through-openings 24, 23 on the side walls 18, 17 and are screwed into threaded receptacles 56 on the retainer 40. The threaded receptacles 56 are located on the abutment surface 50. Thus, the tension anchors 61 can be screwed along their tension anchor load axis S in the direction of the abutment surface 50, wherein they clamp the transverse carrier 12 to the receptacle 50, namely in the direction of the abutment surface 50.

The tension anchors 61 are accommodated in support sleeves 70 forming support elements 80, which have through-openings 71 for the tension anchors 61. The tension anchors 61 have heads 62, which are accommodated in head receptacles 72. The head receptacles 72 are provided on head sections 73 of the support sleeves 70, which stick out laterally from the through-openings 54 on the side wall 18. So, consequently, the head sections 73 are supported with support surfaces 74 on the side wall 18, so that ultimately the heads 62 of the tension anchors 61 and the head sections 73 of the support sleeves 70 clamp the side wall 18 in the direction of the abutment surface 50 and consequently in the direction of the retainer 40.

Thus, the transverse carrier 12 is in any case loaded by means of the support sleeves 70 and the tension anchor 61 in the direction of the retainer 40. Now, there is a danger here of, by way of example, the side wall 18 being deformed in the direction of the side wall 17, so that the transverse carrier 12 or its profile is less loadable. The support sleeve 70 offers resistance to this. In addition, the support sleeve 70 also ensures that the tension anchor 61 also loads the side wall 17 in the direction of the abutment surface 50. To this end, a step is provided between a sleeve segment 76 of the support sleeve 70 and a support protrusion 77 of the support sleeve 70.

The support protrusion 77 penetrates the receptacle 23 and a through-opening 86 of a support element 85 and then penetrates a receptacle 57 of the retainer 50. The support protrusion 77 is supported in its outer circumference both on the circumferential side in the through-opening 23 and also in the receptacle 57. The internal cross section of the through-opening 86 of the support element 85 is also matched to the outer contour of the support protrusion 77, and therefore this is accommodated with a positive fit in all three of said components 57, 86, 23. Thus, the support protrusion 77 can effectively absorb forces acting transversally to the load axis S or transverse forces, without this loading the tension anchor 61 on its screw portion 63. The screw portion 63 is provided on a free end region of the tension anchor 61, which in the present case is designed as a threaded bolt. The screw portion 63 and the head 62 are provided on the longitudinal end regions of bolt portion 64. The bolt portion 64 is accommodated in the sleeve segment 76. The screw portion 63 protrudes from the sleeve segment 76 and is screwed into a screw portion 58 of the threaded receptacle 56 of the retainer 40.

On a trailer coupling 110, the retainer 40 is connected by means of a tension anchor assembly 160 to a transverse carrier 112 of a carrier assembly 111, which is essentially very similar to the transverse carrier 12, but in the mid-section 22 experiences deformation due to the tension anchor assembly 160, which will be described further.

The tension anchor assembly 160 comprises tension anchors 161, by way of example threaded bolts 166, which are designed as stepped bolts. The tension anchors 161 have heads 162, which are supported on the outer side of the side wall 18. Bolt portions 164 of the tension anchors 161 penetrate the hollow space 21 between the side walls 17, 18. In the process, a support surface 74 on the head portion or head 162 is supported externally on the side wall 18 and loads this in the direction of the side wall 17 facing the retainer 40. In this way, the side walls 15, 16, which extend between the side walls 17, 18, are deformed. A side wall section 115 and a side wall section 116 configure the top and bottom side walls 15, 16, which configure a deformation 126 inwards in the direction of the hollow space 21. In this way, the mid-section 22 is further reinforced.

A support protrusion 177 protrudes from the bolt portion 164, which is accommodated in the receptacle 57 of the retainer 40 already described. The support protrusion 177 penetrates the through-opening 23 on the side wall 17, then the through-opening 86 of the support element 85 and finally engages in the receptacle 77. Thus, the support protrusion 77 can also absorb transverse forces Q arising transversally to the load axis S.

Between the support protrusion 177 and the bolt portion 164 a step 175 is provided. On the step 175 there is a support surface 178, which is supported on the inside or inner surface of the side wall 17 (thus, the surface facing the hollow space 21) next to the through-opening 23. In this way, the side wall 17 is clamped or loaded in the direction of the abutment surface 50. The support element 85 positioned between the abutment surface 50 and the side wall 17, transmits the clamping force of the tension anchor 161, acting on the transverse carrier 112, to the abutment surface 50.

The side wall section 116 of the transverse carrier 112 bears against the side support surface 51. Thus, the retainer 40 is supported firstly by the support protrusion 77, and secondly by the interacting surfaces of the side wall 16 and the side support surface 51 transversally to the load axis S.

Compared to the trailer coupling 10, mounting is easier in that the tension anchor 161 simultaneously forms a support element, e.g., no additional support sleeve 70 has to be mounted. Accordingly, the tension anchor 161 preferably has a larger, more loadable cross section in relation to the load axis S. In particular, the support protrusion 177 has a larger cross section than the screw portion 163.

A trailer coupling 710 shows how the fastening concept with a support sleeve and a support protrusion arranged thereon and a tension anchor or threaded bolt separate from this, is also possible with a, so to speak, mid-transversally deformed side carrier.

By way of example, the retainer 40 is fastened by means of the tension anchor assembly 60 and the support sleeves 70 already described on the retainer 40. It will be noticed from the drawing that in this case also, the head portion 73 and in particular the support surface 74 are able to ensure that the side wall 18 can be deformed in the direction of the side wall 17 upon clamping the tension anchor assembly 60 with the retainer 40, so that the deformed side wall sections 115, 116 and the deformation 126 forms on these side wall sections.

On a trailer coupling 810, the retainer 40 is connected by means of a tension anchor assembly 860 with the transverse carrier 12. With the tension anchor assembly 60 and the associated method of support by means of a support sleeve 870, the side wall 18, thus the side wall, facing away from the retainer 40, is not loaded in the direction of the side wall 17 closer to the retainer 40.

The support sleeve 870 accommodates the threaded bolt 66 or tension anchor 61 described above. Their heads 61 are supported in head receptacles 872 of the support sleeves 870. The support sleeves 870 comprise cylindrical head sections 873, which dip into the through-openings 24 and preferably do not protrude outwards from the side wall 18, e.g. opposite the hollow space 21, from the transverse carrier 12. The support sleeves 870 are supported by their outer circumference in the region of the head section 873, namely with an outer contour 874, on an inner contour of a respective through-opening 24. Thus, transverse forces Q acting on the support sleeves 870 transversally to the load axis S are supported on the side wall 18 and thus on the transverse carrier 12 by the support sleeve 870.

Sleeve segments 876 of the support sleeves 870 are accommodated in the hollow space or interior space 21 of the transverse carrier 12. On the front side, thus opposite the head portion 873, a support protrusion 877 protrudes from the sleeve segment 876. The support protrusion 877 engages in the receptacle 57 of the retainer 40 and is supported there transversally to the load axis S with a positive fit. The step 874 again loads in the manner described above, i.e. similarly to the step 75, the side wall 17 in the direction of the abutment surface 50, when the threaded bolt 66 or the tension anchor 61 is connected in the direction of the load axis S with the retainer 40. By way of example, as explained, the screw portion 63 is screwed into the threaded receptacle 56. The support element 85, having a plate-like design, is located sandwiched between the side wall 17 and the abutment surface 50.

On a trailer coupling 410, a retainer 440 is connected by means of a tension anchor assembly 460 with a transverse carrier 412 of a carrier assembly 411.

The transverse carrier 412 has a round, in particular circular, cross section, and so, unlike the transverse carrier 12, is not polygonal. A side wall of the transverse carrier 12 has, by way of example top, bottom and front and back side wall sections (in the use position or in the assembled state on the motor vehicle 90 of the carrier assembly 412), wherein in the following only one side wall 417, which is fastened to the retainer 440 and directly supported by this, is described in detail.

The retainer 440 has the known main body 47, on which a retaining arm 76 for retaining, and in particular supporting so that it can pivot, the already described coupling element 41 is provided. On the main body 47 a receptacle 453 for the transverse carrier 412 is provided. The receptacle 453 has an abutment surface 450 and a side support surface 451, which protrudes from the abutment surface 450 in the direction of load axis S of the tension anchor 461 of the tension anchor assembly 460.

On the abutment surface 450, threaded receptacles 456 are provided for the tension anchors 461, which are screwed into the threaded receptacles 456 by screw portions 463.

The threaded bolts or tension anchors 461 penetrate through-openings 24, 23 of the transverse carrier 12 and are screwed into the threaded receptacles 456, as a result of which they clamp the retainer 440 along load axis S with the transverse carrier 412.

The tension anchors 461 also penetrate support sleeves 430, which are arranged in the interior space or hollow space 421 of the transverse carrier 412. The support sleeves 430 ensure, in particular, that the head 462 does not deform in the direction of the retainer 400, or only to a predetermined extent, the side wall section 417 or the side wall section 418 opposite the retainer 440 of the transverse carrier 412 or profile part 420.

The tension anchors 461 are also supported transversally to the load axis S, namely by the side support surface 451, at least indirectly by the side support surface 461.

In the receptacle 453 and thus between the retainer 440 and the transverse carrier 412, a support element 480 designed as a support plate 470 is arranged. The support plate 470 has an inner contour 472, matched to the outer contour of the transverse carrier 12. An outer contour 473 of the support element 480 is for its part matched to an inner contour of the receptacle 453, and consequently to a contour which is defined by the abutment surface 450 and the side support surface 451. Thus, the support element 480 is accommodated in the receptacle 453 with a positive fit.

The inner contour 472 also allows support with a positive fit of the transverse carrier 412 on the support element 480, namely along the load axis S, but also transversely thereto. By way of example, the side support surface 451 is, so to speak, extended by the support element 480 in the direction of the transverse carrier 412, so that a bottom side wall section 416 of the transverse carrier 412 is supported transversally to the load axis S on the support element 480 and finally on the side support surface 451. A support section 452 of the support element 480 opposite the side support surface 451 ensures that a top side wall section 415 of the transverse carrier 12 is also supported on the support element 480 transversally to the load axis S.

However, the support element 480 also performs a guidance and security function for the threaded bolt or tension anchor 461. The tension anchor 461 penetrates in particular a through-opening 471 of the support element 480 and protrudes with its screw portion 463 from the support element 480. The through-opening 471 is provided on a support protrusion 477, which engages in the receptacle 423 of the transverse carrier 412 and thus supports the tension anchor 61 transversally to the load axis S. Transverse forces acting transversally to the load axis S on the combination of retainer 440 and transverse carrier 412 are thus effectively absorbed by the support protrusion 477.

On a front side, i.e. facing away from the retainer 440 or facing away from the abutment surface 450, of the support protrusion 477 a support sleeve 430 is supported, which is likewise penetrated by the threaded bolt or tension anchor 461. Thus, the head 462 loads the support sleeve 430 along the load axis S against the support surface 475, which contributes towards the clamping of the support element 480 with the receptacle 453 or the retainer 440.

On longitudinal end regions 413 of the transverse carrier 412 fastening means are provided for fastening the carrier assembly 411 to the motor vehicle 90, which is not shown in connection with the trailer coupling 410. By way of example, side carriers 414 or fastening legs 414 are provided, which have plate-shaped carrier elements 426. On the carrier elements 426 screw openings 428 are provided, through which the screws 427 or similar other screwing means for screwing the carrier assembly 411 to the motor vehicle 90 are provided. With the screws 428, the carrier assembly 411 can, by way of example, be screwed to a rear bodywork panel or to side members of the bodywork 91.

Expediently, the support sleeves 430 are flush undermounted with regard to the side wall section 418, so that the head 462 is able to deform the side wall section 418 in the direction of the side wall section 417.

The invention claimed is:

1. A trailer coupling for a motor vehicle, comprising: a carrier assembly, which has a transverse carrier designed as a profile part at least in sections and a retainer retained on the transverse carrier for retaining a coupling element, of the trailer coupling, wherein the coupling element is provided for fastening a trailer or a load carrier, wherein the retainer is connected to the transverse carrier by a tension anchor of a tension anchor assembly, wherein the tension anchor penetrates the transverse carrier along a tension anchor load axis of the tension anchor and loads an abutment surface of the retainer, through which abutment surface the tension anchor load axis or an axis parallel to the tension anchor load axis passes, against a side wall of the transverse carrier, said side wall having a through-opening for the tension anchor, wherein the tension anchor assembly has a support element having a support surface and having a support protrusion which protrudes from the support surface in the direction of the tension anchor load axis, and which engages in the through-opening of the side wall, wherein the support surface of the support element is supported on the side wall of the transverse carrier next to the through-opening by at least one force component in the direction of the load axis and the support protrusion is supported in the through-opening by at least one force component transverse to the load axis.

2. The trailer coupling according to claim 1, wherein the support surface of the support element is opposite the abutment surface of the retainer, so that the side wall of the transverse carrier is sandwiched between support surface and the abutment surface.

3. The trailer coupling according to claim 1, wherein the support element is a component that is separate from the tension anchor, and/or from the retainer.

4. The trailer coupling according to claim 1, wherein the support element is arranged in an interior space of the profile part or outside of the profile part.

5. The trailer coupling according to claim 1, wherein the support protrusion has a receptacle or through-opening, in which the tension anchor engages or which the tension anchor penetrates.

6. The trailer coupling according to claim 1, wherein the support element is plate-shaped and/or has the same contour as the side wall of the transverse carrier.

7. The trailer coupling according to claim 1, wherein the support element is supported in a planar fashion by the transverse carrier.

8. The trailer coupling according to claim 1, wherein the support element has at least two support protrusions, which each engage in a through-opening of the side wall of the transverse carrier.

9. The trailer coupling according to claim 1, wherein the support element has a head or head portion, which is accommodated in a second through-opening of a second side wall, opposite the side wall of the transverse carrier, which accommodates the support protrusion.

10. The trailer coupling according to claim 9, wherein the head is supported transversally to the load axis on at least one inner contour of the second through-opening and/or protrudes laterally from the through-opening of the second side wall.

11. The trailer coupling according to claim 9, wherein the head loads the second side wall in the direction of a first side wall or of the retainer.

12. The trailer coupling according to claim 11, wherein at least one side wall joining the first and the second side wall is deformed by the tension anchor, transversally to the load axis.

13. The trailer coupling according to claim 1, wherein the support surface is provided on a threaded bolt, which protrudes with a screw portion towards the retainer wherein the support surface protrudes like a step laterally from the screw portion.

14. The trailer coupling according to claim 1, wherein the support protrusion is formed by the screw portion or a bolt portion provided between the screw portion and the support surface.

15. The trailer coupling according to claim 1, wherein the support surface is provided on a support sleeve, having a through-opening for the tension anchor and which is penetrated by the tension anchor.

16. The trailer coupling according to claim 15, wherein the support sleeve has a head portion, having a head receptacle in which a head of the tension anchor is accommodated, wherein the head portion protrudes laterally from the second through-opening.

17. The trailer coupling according to claim 15, wherein the support sleeve does not protrude from an outer side of the second side wall facing away from a first side wall.

18. The trailer coupling according to claim 17 wherein the support sleeve is in line with the outer side.

19. The trailer coupling according to claim 17, wherein the support sleeve sits back behind the outer side or is flush undermounted with regard to the outer side.

20. The trailer coupling according to claim 1, wherein the tension anchor of the tension anchor assembly does not protrude from a side wall of the transverse carrier, opposite the side wall accommodating the support protrusion.

21. The trailer coupling according to claim 1, wherein on the retainer a receptacle for the support protrusion is provided, in which the support protrusion engages.

22. The trailer coupling according to claim 21, wherein the support protrusion is supported in the receptacle transversally to the load axis.

23. The trailer coupling according to claim 1, wherein the retainer has at least one side support surface, which protrudes from the abutment surface next to the tension anchor and bears against the transverse carrier, so that the retainer is supported on the transverse carrier laterally next to the tension anchor in respect of a force acting transversally to the tension anchor load axis of the tension anchor.

24. The trailer coupling according to claim 23, wherein the at least one side support surface is or comprises a rounded side support surface.

25. The trailer coupling according to claim 23, wherein the at least one side support surface and the abutment surface merge continuously and/or without an edge running between the side support surface and the abutment surface and/or form a circular curvature contour.

26. The trailer coupling according to claim 23, wherein the at least one side support surface and the abutment surface form an L-shaped cross section of the retainer or are arranged in an L-shape and/or in that the retainer is supported exclusively by the at least one side support surface and the abutment surface on the transverse carrier.

* * * * *